United States Patent Office 3,159,312
Patented Dec. 1, 1964

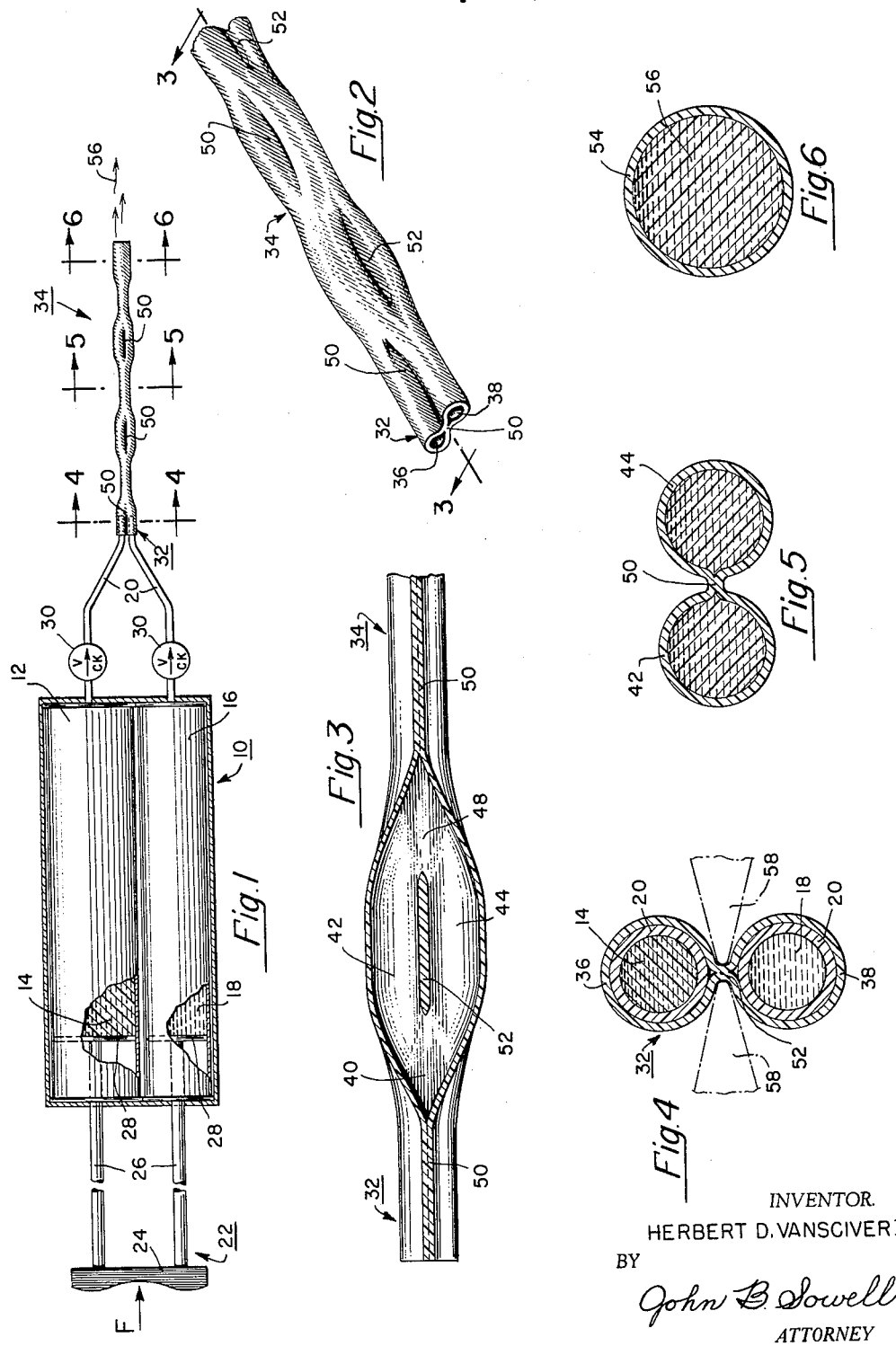

3,159,312
DISPENSING DEVICE FOR MIXING TWO VISCOUS FLUIDS
Herbert D. Van Sciver II, Merion, Pa., assignor to The Budd Company, Philadelphia, Pa., a corporation of Pennsylvania
Filed Sept. 28, 1962, Ser. No. 226,928
5 Claims. (Cl. 222—137)

This invention relates to a dispensing device and more particularly to mixing tubes for combining plastic and hardener which enter the tubes as separate components.

Self-curing plastics such as epoxy resins require a hardener or catalyst to initiate or start the self-curing process. The usual manner of mixing such plastics and their hardener is to combine the two ingredients in a disposable receptacle or container. After being mixed, the ingredients begin to solidify or cure and rapidly become unworkable. It has been the practice in the past to mix plastic and hardener in small amounts analogous to the manner in which concrete mortar is prepared. Heretofore, mixing of large batches of plastic has proven wasteful of plastic and mixing of small batches of plastic proves wasteful of both materials and labor.

It is therefore a general object of the present invention to provide a dispensing device for plastic and hardener which dispenses any desired amount of pre-mixed plastic and hardener as an uncured fluid.

It is a further object of the present invention to provide a novel disposable mixing tube for receiving a plurality of separate fluids and maintaining the fluids in separate passageways in the tube prior to mixing the fluid as it passes through the tube.

Other objects and advantages of the dispensing device and the mixing tube will become evident from the description when read in connection with the drawings which follow:

FIG. 1 is a side elevation of a preferred embodiment of the present invention with a portion of the dispensing housing broken away;

FIG. 2 is a partial perspective of the novel mixing tube embodied in the dispensing device of FIG. 1;

FIG. 3 is an enlarged section of a portion of the mixing tube taken at lines 3—3 of FIG. 2;

FIG. 4 is an enlarged cross-section taken at lines 4—4 of FIG. 1 showing the inlet of the mixing tube and the connected conduits of the dispensing device;

FIG. 5 is an enlarged section in elevation taken at lines 5—5 of FIG. 1;

FIG. 6 is an enlarged elevation taken at lines 6—6 of FIG. 1 showing the outlet of the novel mixing tube.

Referring now to FIG. 1 showing a storage container 10 comprising a dispensing cylinder 12 containing a resin or plastic fluid 14 and a second dispensing cylinder 16 containing a hardener or catalyst 18. The hardener 14 and catalyst 18 are forced from their respective cylindrical dispensers through individual conduits 20 connected to the respective cylinders by means of a tandem drive 22 which comprises a yoke 24, drive rods 26 and pistons 28. It will be understood that a force F applied to the yoke 24 causes pistons 28 to displace the fluids 14 and 18 proportional to the diameter of the cylinders 12 and 16. The displaced fluids separately pass through spring-loaded check valves 30 and continue as separately conducted fluids in conduits 20 into the inlet 32 of mixing tube 34.

Referring now to FIGS. 2 to 6, fluids 14 and 18 are separately conducted through conduits 20 into the inlet 32 which is provided with two or more separate inlet passageways to assure that the fluids 14 and 18 are not intermixed at the termination of the conduits 20. Separate passageways 36 and 38 conduct the fluids to a first mixing plenum 40 where the fluids are first intermixed. The intermixed fluids are divided into separate passageways 42 and 44 which act as a first mixing section 46 and further intermix the divided fluid. As the divided fluid in passageways 42 and 44 passes into a second mixing plenum 48 the fluid is again mixed. The mixing tube comprises a plurality of mixing sections interconnected by mixing plenums, thus, the fluids are mixed in the plenums, divided in the mixing section where mixing becomes more complete, and remixed in the next subsequent mixing plenum until the fluid becomes completely homogeneous.

A preferred mixing tube 34 was constructed with alternate baffles 50 and 52 aligned normal to each other so that the fluid leaving the mixing plenums is forced to divide between the passageways in the next succeeding mixing station. The cross-section area of the plenums being larger than the cross-section area of the passageways causes turbulent mixing. Outlet 54 of the mixing tube 34 may be completely circular or unformed, as shown. Alternatively, if large lengths of the mixing tube 34 are produced by automatic processes, the outlet may appear as a mixing plenum or mixing section, but fluids 14 and 18 are intermixed to form a self-curing plastic 56 at the outlet 54.

A preferred method of making a mixing tube contemplates forming sections of flexible and cylindrical thermoplastic tubes which do not chemically react with either the plastic or the hardener. As shown in FIG. 4 the mixing sections and/or inlets are formed by clamping a portion of thermoplastic cylindrical tube between electrodes 58 and forcing the opposite walls of the cylindrical tube together. After the electrodes have forced the opposite walls in mating relationship a high frequency current is passed from one electrode to the other, thus causing a fusion of the thermo-plastic at the mating interface of the opposite walls due to dielectric heating. While only one set of electrodes is shown to illustrate the principle of the invention it will be understood that a plurality of such electrodes may be applied in different planes along the length of the mixing tube.

While a preferred embodiment of the present invention has been shown and described, it is apparent that the storage containers 10 may be submerged in or connected to large reservoirs of plastic and hardener or that the dispensing cylinders may be mounted on a portable hard gun so that any desired amount of pre-mixed self-curing plastic 54 may be dispensed directly and applied to a workpiece without the requirement of manual handling of either the plastic or the hardener or the resulting self-curing plastic mixture. The preferred embodiment shown is particularly adaptable for mass production purposes for the novel dispensing device may be employed during a work shift and completely abandoned for long periods of time. The self-curing plastic mixture left in the mixing tube will harden but the passageways 36 and 38 at the inlet 32 contain plastic and hardener which will not intermix to form a self-curing plastic mixture, permitting the removal of mixing tube 34 and replacement with a similar disposable tube without the need to clean out or unplug the dispensing device. The present dispensing device completely eliminates the need for mixing tanks and the labor required to mix batches of plastic and hardener as well as the need to clean up after using a self-curing plastic.

Other uses of the novel dispensing device will suggest themselves to those skilled in the art. Accordingly, the appended claims should be given a broad interpretation commensurate with the scope of the invention.

What is claimed is:
1. A dispensing device for dispensing and mixing metered amounts of self-curing plastic and hardener fluids comprising, a first storage container having a dispensing cylinder of a first diameter, a second storage container having a dispensing cylinder of a second diameter, a piston in each of said cylinders, a tandem drive connected to said pistons for driving said pistons and dispensing fluids in said containers in metered amounts proportional to the diameter of the respective cylinders, and a mixing tube connected to said disepnsing cylinders, said tube having an inlet and an outlet with separated passageways and a series of baffles aligned in a plurality of axes therebetween for mixing said metered amounts of self-curing plastic and hardener fluids as they pass from said inlet to the outlet of said mixing tube, whereby said fluid and hardener are dispensed and mixed simultaneously between said inlet and said outlet of said tube.

2. A dispensing device for mixing self-curing plastics comprising, a first container for the storage of a resin, a second container for storage of a resin hardener, supply conduits connected to said first and said second containers, said conduits terminating as a bifurcated connector, a mixing tube comprising a connector end and an outlet end and intermediate said ends, a plurality of baffles which divide said tube into two parts, said baffles being arranged in two basic axes one normal to the other, said mixing tube being connected to said bifurcated connector of said conduits, and positive displacement pistons in said containers for forcing a metered amount of said resin and said hardener from said containers through said conduits and through said mixing tube, whereby unmixed resin and hardener in said containers is dispensed from said outlet end of said mixing tube as a homogeneous mixed self-curing plastic.

3. A longitudinal mixing tube for intermixing fluids comprising, an inlet portion having a plurality of individual passageways, a first mixing plenum connected to and spaced longitudinally adjacent said inlet section, a first mixing section connected to and spaced longitudinally adjacent said mixing plenum, an intermediate mixing plenum connected to and spaced longitudinally adjacent said first mixing section, a last mixing section connected to and spaced longitudinally adjacent said intermediate mixing plenum, diversionary baffles in said mixing sections dividing said sections into two separate passageways, and an outlet portion connected to and spaced longitudinally adjacent said last mixing station, whereby fluids entering said inlet portion are intermixed in said mixing tube before reaching said outlet.

4. A longitudinal mixing tube for intermixing fluids as set forth in claim 3 which further comprises a plurality of mixing sections and mixing plenums connected between said intermediate mixing plenum and said last mixing section.

5. A longitudinal mixing tube for intermixing fluids as set forth in claim 3 which further includes a plurality of positive displacement piston feed devices one for each of said plurality of individual passageways of said inlet portion.

References Cited by the Examiner
UNITED STATES PATENTS

| | | | |
|---|---|---|---|
| 2,750,900 | 6/56 | Moore | 222—575 XR |
| 2,826,339 | 3/58 | Maillard | 222—387 XR |
| 2,959,327 | 11/60 | Bloom | 222—575 XR |
| 3,105,615 | 10/63 | Motoyuki Koga | 222—145 XR |

FOREIGN PATENTS 582,563  10/24  France.

RAPHAEL M. LUPO, *Primary Examiner.*

LOUIS J. DEMBO, *Examiner.*